United States Patent
Michaelis

(10) Patent No.: US 7,644,607 B2
(45) Date of Patent: Jan. 12, 2010

(54) METHOD FOR MONITORING THE LOAD CONDITION OF AN ENGINE AND CORRESPONDING DEVICE

(75) Inventor: Gerd Michaelis, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 11/665,825

(22) PCT Filed: Oct. 10, 2005

(86) PCT No.: PCT/EP2005/055130

§ 371 (c)(1),
(2), (4) Date: Apr. 19, 2007

(87) PCT Pub. No.: WO2006/042806

PCT Pub. Date: Apr. 27, 2006

(65) Prior Publication Data

US 2009/0066485 A1 Mar. 12, 2009

(30) Foreign Application Priority Data

Oct. 19, 2004 (DE) .................. 10 2004 050 899

(51) Int. Cl.
*G01M 15/05* (2006.01)

(52) U.S. Cl. ................................. 73/114.13

(58) Field of Classification Search .............. 73/114.13, 73/114.14, 114.15, 114.24, 114.25
See application file for complete search history.

(56) References Cited

U.S. PATENT DOCUMENTS

| 5,027,044 A | | 6/1991 | Nishimura et al. |
| 5,889,204 A | * | 3/1999 | Scherer et al. ............ 73/114.37 |
| 5,986,545 A | * | 11/1999 | Sanada et al. ............... 340/439 |
| 6,529,135 B1 | | 3/2003 | Bowers et al. |
| 6,742,501 B2 | * | 6/2004 | Hirano ................... 123/406.24 |
| 2002/0189587 A1 | * | 12/2002 | Hirano ................... 123/406.24 |
| 2004/0084014 A1 | | 5/2004 | Hawkins et al. |

FOREIGN PATENT DOCUMENTS

| DE | 690 17 736 T2 | 3/1995 |
| DE | 100 49 506 A1 | 4/2001 |
| JP | 04019118 A | 1/1992 |
| WO | WO 01/28401 A1 | 4/2001 |

* cited by examiner

*Primary Examiner*—Eric S McCall

(57) ABSTRACT

There is described a method for monitoring the load condition of a variable speed engine. Said method shows a determination of an actual speed and an actual load moment during operation. A warning signal is emitted when the actual load moment remains outside a monitoring range, predetermined depending on the speed, for the duration of a predetermined delayed reaction time.

15 Claims, 3 Drawing Sheets

METHOD FOR MONITORING THE LOAD CONDITION OF AN ENGINE AND CORRESPONDING DEVICE

CROSS REFERENCE TO RELATED APPLICATIONS

This application is the US National Stage of International Application No. PCT/EP2005/055130, filed Oct. 10, 2005 and claims the benefit thereof. The International Application claims the benefits of German application No. 10 2004 050 899.2 DE filed Oct. 19, 2004, both of the applications are incorporated by reference herein in their entirety.

FIELD OF INVENTION

The present invention relates to a method for monitoring the load condition of a variable speed engine. The invention further refers to a device operating according to this method.

BACKGROUND OF INVENTION

As a rule, a variable speed engine operates against a mechanical load moment, which varies with a speed, which is determined in particular by a function of the speed of the engine. At present, such an engine generally features a comparator, which sets off a warning when the load moment of an engine exceeds a warning limit value. When the load moment of an engine for example increases quadratically with the speed, then at high speed correspondingly high load moments occur, according to which the warning limit value must be adjusted. As a consequence, in the case of a comparatively low speed of an engine, a considerable deviation from the load moment is often not detected because the load moment does not exceed the warning limit value that has been set for high speeds.

SUMMARY OF INVENTION

An object underlying the present invention is thus to specify an especially effective method for monitoring the load condition of a variable speed engine and a suitable device for carrying out the method.

With regard to the method, the above-mentioned object is achieved in accordance with the invention by means of the features of an independent claim. In this process, said method being characterized by determining during operation an actual speed and an actual load moment of an engine. The actual load moment is compared with a monitoring range, which has been predetermined as a function of the speed. When the actual load moment remains outside the monitoring range, predetermined for the actual speed, for the duration of a predetermined delayed reaction value, a warning signal is emitted.

In this case, an "actual load moment" refers to a continuously or a regularly raised measured value of the load moment. The term "actual speed" refers to a measured value of the speed that is raised at corresponding points in time in each case, which in particular corresponds to the speed of an engine. The monitoring range that is predetermined as a function of the speed is specified in particular by a lower limit value varying with the speed which, when undershot, triggers a warning signal, and an upper limit value varying especially with the speed, which when exceeded, triggers a warning signal. In a plane drawn by the speed as the abscissa and the load moment as the ordinate, the curve of the monitoring range that is predetermined as a function of the speed with a varying speed shows an enclosed area in particular that is referred to as a monitoring zone below. In this two-dimensional view, the warning signal is triggered in an equivalent manner when the actual load condition defined by the actual speed and the actual load moment, leaves the monitoring zone for the duration of the delayed reaction time.

Further advantageous embodiments of the method are defined in the subclaims referred back to the independent claim.

With regard to the device operating in accordance with the method, the above-mentioned object is achieved in accordance with the invention by means of the features of an independent claim. Thus the device according to the invention comprises a measuring device for determining the actual speed and the actual load moment of an engine. As a measurement for the speed of the engine, a speed is in particular determined with which the engine performs a number of revolutions per unit of time. In addition, the device comprises a monitoring device, which is embodied to emit a warning signal when the determined actual load moment lies outside a monitoring range predetermined as a function of the speed, for a predetermined delayed reaction time.

Further advantageous embodiments of the device are defined in further subclaims referred back to the further independent claim.

In accordance with an advantageous embodiment, in addition to a first monitoring range, provision has been made for one or more additional monitoring ranges to which a specific additional delayed reaction time is allocated in each case.

In order to be able to react in a differentiated manner to varying deviations of the actual load moment from the specific expectation value, provision has been made in a practical manner at least to fully record the first monitoring range in the one monitoring range or in each additional monitoring range. According to an especially preferred variant, a longer delayed reaction time is allocated to the innermost of the two monitoring ranges by comparison with the outer monitoring range. This serves to allow a correspondingly small deviation, which only brings about a leaving of the inner monitoring range by the actual load moment, for a longer period of time than a correspondingly strong deviation for which the load moment also leaves the outer monitoring range.

With a view to an effective and, in particular, a determination that can be automated easily of the one monitoring range or of each monitoring range or of the one monitoring zone or of each monitoring zone, provision has preferably been made for determining during a configuration operation of the engine a load histogram as a function of the speed, on the basis of which the monitoring zone or the monitoring range is then derived. The load histogram refers to a frequency distribution, which indicates the frequency at which a specific load moment occurs on average at a specific speed of the engine during normal operation. The load histogram is determined for practical reasons by the summation in classes of the load conditions occurring during a configuration operation. The load histogram is preferably determined and the one monitoring zone or each monitoring zone and subsequently derived and thus the one monitoring range or of each monitoring range occurring for a given speed by a configuration unit embodied for this purpose.

As a simple and practical engineering design specification for the derivation of the one monitoring zone or of each monitoring zone or of the one monitoring range or of each monitoring range, provision has been made for a circle to be formed around each point of the load histogram in the plane drawn by the load moment and the speed. In this case, the specific radius of these circles varies as a function of the histogram height (or the class frequency). In addition or as an alternative, the radius has preferably been specified as a function of the load moment and/or the speed. In this process, the monitoring zone is given as the area enclosed by the circles, i.e. by means of their union of sets. In this case, the one monitoring zone or each monitoring zone can be embodied as required by an enclosed area or a plurality of partial areas lying next to one another.

As an alternative to this, the area of the one monitoring zone or of each monitoring zone is also determined by a circular area with a predetermined radius around the average value of the frequency of the load histogram. Instead of circles, other outer contour forms can also be used if required. The one monitoring range or each monitoring range occurring for a given speed is obtained according to the definition by a cross-section through the corresponding monitoring zone that corresponds to this speed. In addition, the one monitoring zone or each monitoring zone can also be derived by using other algorithms, in particular also manually.

The advantages achieved by the underlying invention consist in particular of the fact that an actual load moment applied to an engine is monitored by means of a monitoring range, which takes into account the machine-specific speed dependence of the load moment. Consequently, deviations are detected both for a high speed of the engine and for a low speed of the engine according to criteria that are still appropriate and, in this way, effectively identified independently of the actual speed.

BRIEF DESCRIPTION OF THE DRAWINGS

The invention is described in more detail below with reference to the exemplary embodiment specified in the figures of the drawing. They are as follows.

In the figures in the drawings, the same reference characters are used for components and values that correspond to one another.

DETAILED DESCRIPTION OF INVENTION

Figure 1:
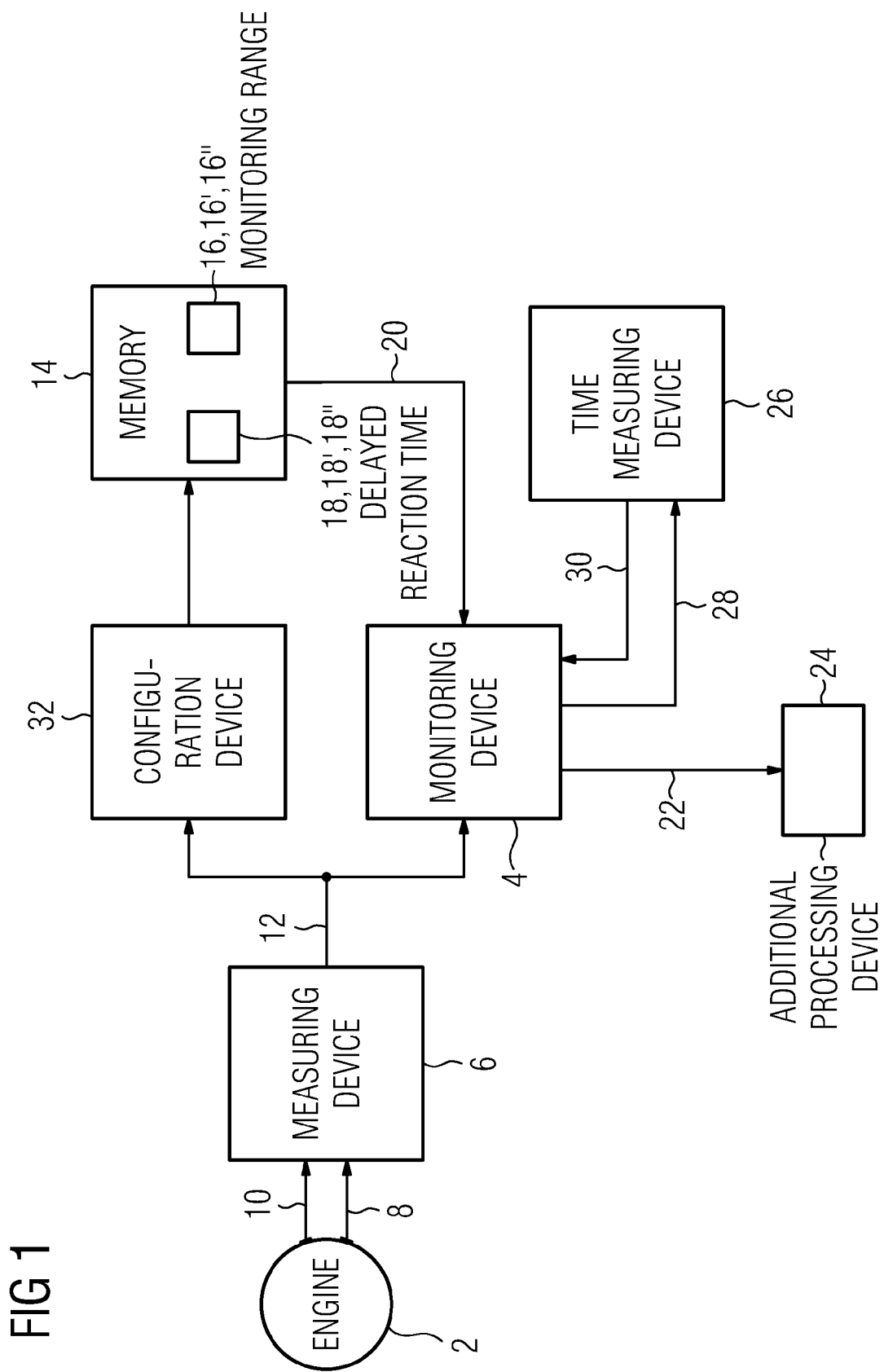
FIG. 1 a basic circuit diagram of an engine with a device for monitoring the load condition, FIG. 2 a load histogram with a monitoring range to monitor the load condition of the engine according to FIG. 1, FIG. 3 as shown in FIG. 2, the load histogram with two alternatively embodied monitoring ranges.

FIG. 1 shows an engine 2, which during operation operates against a mechanical load moment M with a speed v predetermined in particular by a speed. The engine 2 is a device operating according to the method of the underlying invention for monitoring the load condition.

The device comprises a monitoring device 4 and a measuring device 6. During operation of the engine 2, the measuring device 6 determines continuously or regularly both a measured value of the load moment M (referred to as the actual load moment 8 below) and a measured value of the speed v (referred to as the actual speed 10 below). The measuring device 6 makes available a measurement data signal 12 to the monitoring device 4, which comprises information about the actual load moment 8 and the actual speed 10 of the engine 2. The monitoring device 4 monitors whether or not the actual load moment 8 lies within a monitoring range 16 applicable with a view to the actual speed 10. The monitoring range 16 is stored in a memory 14 as a function of the speed v.

If the actual load moment 8 leaves the monitoring range 16 that has been predetermined for the actual speed 10, the monitoring device 4 after the expiry of a predetermined delayed reaction time 18 stored in a memory 14, which is fed to the monitoring device 4 via a data signal 20, emits a warning signal 22. The warning signal 22 is fed to an additional processing device 24, which is embodied for adjusting or switching off the engine 2 and/or converting the warning signal 22 into an optically and/or an acoustically perceivable signal for an observer.

If the actual load moment 8 thus leaves the monitoring range 16, the monitoring device 4 of a time measuring device 26 transmits a start signal 28 so as to start measuring the time for the predetermined delayed reaction time 18. After the expiry of the delayed reaction time 18, the time measuring device 26 of the monitoring device 4 sends an end signal 30. If at the point in time of the entry of the end signal 30 at the monitoring device 4, the load moment 8 as a function of the speed still remains outside the monitoring range 16, the monitoring device 4 emits a warning signal 22. If the load moment 8 prior to the generation of the end signal 30 returns to the monitoring range, the above-described time measuring device 26 is reset. In order to stabilize the method in particular in the case of a strong fluctuation of the load moment, the actual speed 10 and/or the actual load moment 8 is preferably smoothed in time prior to the comparison with the monitoring range 16.

Furthermore, the device comprises a configuration device 32. During a configuration operation of the engine 2, the configuration device 32 is fed the measurement data signal 12 from the measuring device 6, which transmits information about the actual load moment 8 and the actual speed 10 of the engine 2. The configuration device 32 is embodied in such a way that it can determine the monitoring range 16. To this end, the configuration device 32 collects over a suitable period of time T measurement data from the measuring device 6 and generates from this a load histogram 34 as a function of the speed (FIG. 2).

Figure 2:
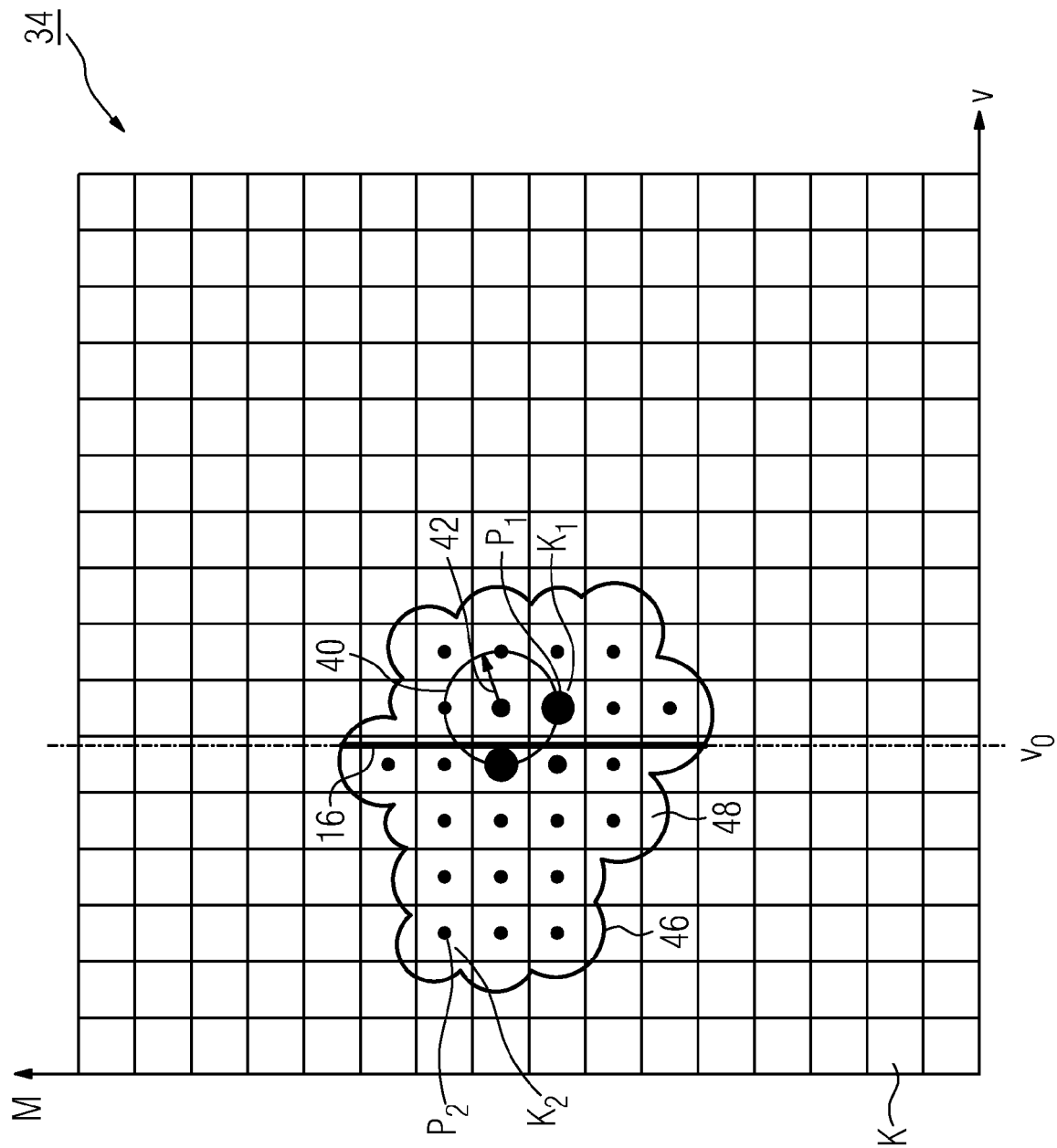
Figure 3:
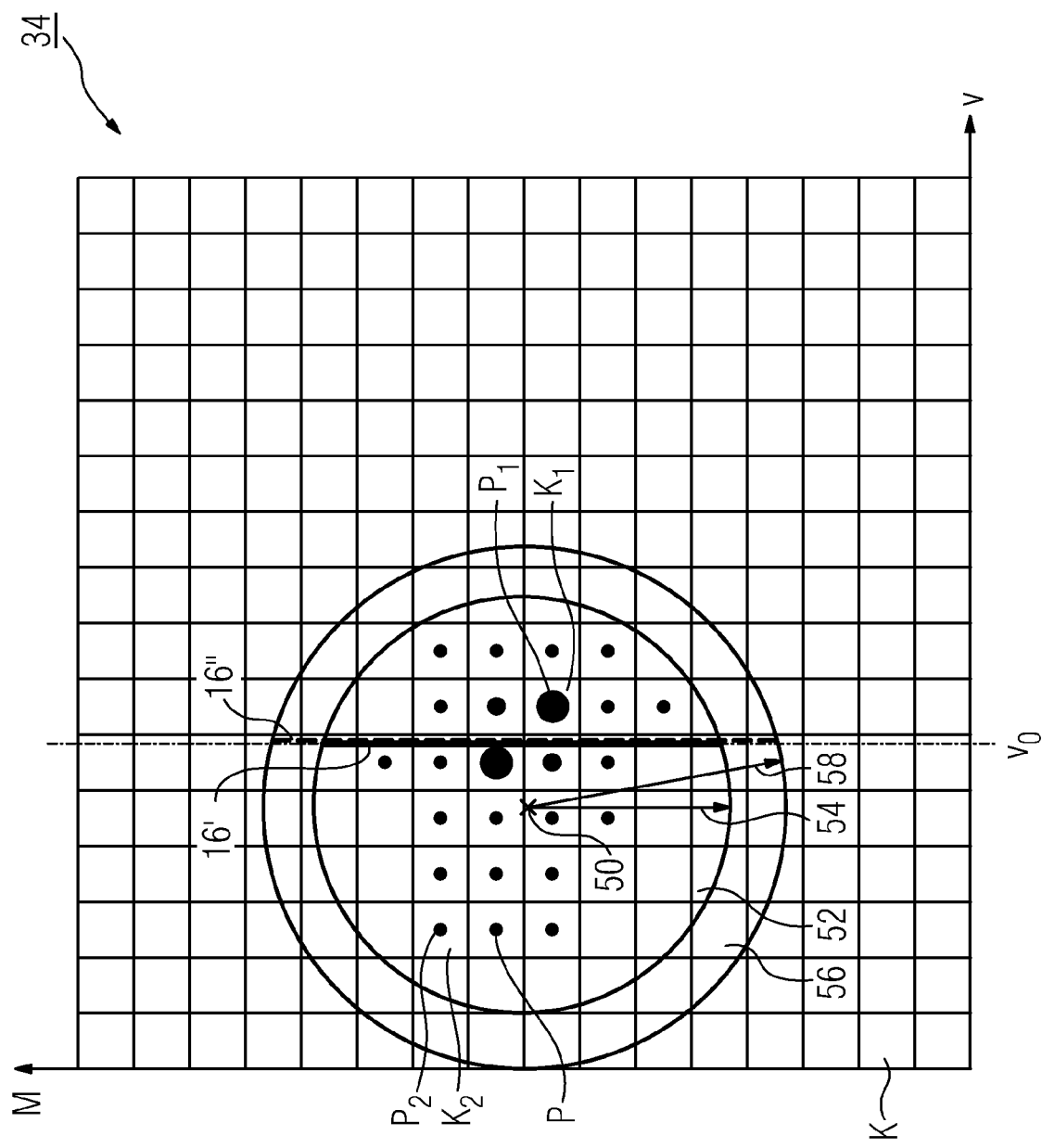

FIGS. 2 and 3 in each case show a typical sketch of such a load histogram 34 in projection on a mathematical plane, which is depicted by the speed v as the ordinate and the load moment M as the abscissa. The load histogram 34 is subdivided into a number of classes K, to each of which a specific speed range and a specific load moment range is allocated.

The load conditions detected during a configuration operation are allocated to the individual classes K of the load histogram 34 and summed in classes. Each point P entered in FIGS. 2 and 3, represents the height of the load histogram of the class K allocated to it, therefore the frequency of the load conditions allocated to the class K assumed over the period of time T by the engine 2. The more frequently the load conditions allocated to a class K occurred during the period of time T, the greater the diameter of the corresponding point P entered in the class K. For example, over a period of time T, the engine 2 presents a load condition $P_2$ characterized by a point $P_1$ in the class $K_1$ more frequently than an operating condition characterized by the point in the class $K_2$. The classes K of the histogram heights of which drop below a minimum value are represented as blank squares in FIGS. 2 and 3. In this way, the load histogram 34 forms a discrete frequency distribution of the load conditions that occurred during a configuration operation over the period of time T.

In order to determine in an embodiment of the method explained in FIG. 2, a monitoring range 16 to monitor an engine 2 during normal operation, a circle 40 is first of all allocated to each class K of the load histogram 34 whose circle radius 42 is specified as a function of the histogram height. In this case, the circle radius 42 is set at zero in particular for the classes K, the histogram heights of which drop below a minimum value so that only the classes K represented in FIG. 2 by points P are actually taken into account. The area enclosed by the circles 40 by a common contour 46, is used as the monitoring zone 48, which for a given value $v_o$ of the speed v defines the corresponding monitoring range 16.

FIG. 3 shows an alternative embodiment of the method according to which a monitoring zone 52 is determined, while an average value of the frequency 50 of all the class frequencies of the load histogram 34 is first of all specified (indicated in FIG. 3 with an x). In this case, the monitoring zone 52 is embodied as an x around this average value of the frequency 50 with a circle radius 54. The circle radius 54 is in particular adapted to the width of the load histogram 34. The monitoring range 16" to be derived from the monitoring zone 52 for a given value $v_o$ of the actual speed v is obtained in the same way as in FIG. 2 by a cross-section through the monitoring zone 52 that corresponds with the value $v_o$.

In a refined embodiment of the invention, a second monitoring zone 56 is specified in addition to the first monitoring zone 52, which fully incorporates the monitoring zone 52 and in this way in particular comprises a correspondingly larger radius 58. A monitoring range 16" can be derived from the monitoring zone 58, which is for example entered for the value $v_o$ of the speed in FIG. 3 and which still fully incorporates the monitoring range 16'.

In this case, a first delayed reaction time 18' (FIG. 1) is allocated to the first monitoring zone 52 or to the first monitoring range 16', which exceeds a second delayed reaction time 18" (FIG. 1) that is allocated to the second monitoring zone 56 or the second monitoring range 16".

The invention claimed is:

1. A method for monitoring a load condition of a variable speed engine, comprising:
   determining an actual speed of the variable speed engine during operation;
   determining an actual load moment of the variable speed engine during operation;
   emitting a first warning signal when the actual load moment lies outside a first monitoring range for a duration of a first predetermined delayed reaction time, wherein the first monitoring range is predetermined based upon a speed value; and
   emitting a second warning signal when the actual load moment lies outside a second monitoring range for a duration of a second predetermined delayed reaction time, wherein the second monitoring range is predetermined based upon the speed value.

2. The method as claimed in claim 1, wherein a shape of a monitoring area is a circle around an average value of a frequency of a load histogram, wherein a radius of the circle is based upon the speed value.

3. The method as claimed in claim 1, wherein a shape of a monitoring area is a circle around an average value of a frequency of a load histogram, wherein a radius of the circle is based upon a load moment.

4. The method as claimed in claim 1, wherein the first monitoring range is included entirely in the second monitoring range, and wherein the first delayed reaction time exceeds the second delayed reaction time.

5. The method as claimed in claim 4, wherein a monitoring range is determined based upon a load histogram, wherein the load histogram is based upon the speed, and wherein the monitoring range is at least one of the first and second monitoring ranges.

6. The method as claimed in claim 5, wherein the size of the monitoring range is based upon a histogram height.

7. The method as claimed in claim 4, wherein a monitoring range is determined based upon a load histogram, wherein the monitoring range is an area enclosed by a outer contour form circles around classes of the load histogram, and wherein the monitoring range is at least one of the first and second monitoring ranges.

8. The method as claimed in claim 7, wherein a radius of the circles is based upon a height of the histogram.

9. The method as claimed in claim 7, wherein a radius of the circles is based upon the speed.

10. The method as claimed in claim 7, wherein a radius of the circles is based upon the load moment.

11. A system for monitoring a load condition of a variable speed engine, comprising:
    a measuring device to determine an actual speed and an actual load moment;
    a monitoring device emitting a warning signal when the load moment remains outside a predetermined monitoring range based upon the speed; and
    a configuration device to determine the predetermined monitoring range during a configuration operation of the engine based upon a speed-dependent load histogram.

12. The method as claimed in claim 11, wherein a shape of the monitoring area is a circle around an average value of a frequency of the load histogram, wherein a radius of the circle is based upon a speed value.

13. The method as claimed in claim 11, wherein a shape of the monitoring area is a circle around an average value of a frequency of the load histogram, wherein a radius of the circle is based upon a load moment.

14. The method as claimed in claim 11, wherein a size of the monitoring range is based upon a histogram height.

15. The method as claimed in claim 11, wherein the monitoring range is an area, which is enclosed by a outer contour form circles around classes of the load histogram.

* * * * *